E. ALDOM.
Improvement in Spring Perch for Bird Cages.

No. 121,742.  Patented Dec. 12, 1871.

Witnesses:
A. Bennerwendorf
Francis McArdle

Inventor:
E. Aldom
per ___
Attorneys.

AM. PHOTO-LITHOGRAPHIC CO. N.Y. (OSBORNE'S PROCESS.)

UNITED STATES PATENT OFFICE.

EDWARD ALDOM, OF NEW YORK, N. Y.

IMPROVEMENT IN SPRING-PERCHES FOR BIRD-CAGES.

Specification forming part of Letters Patent No. 121,742, dated December 12, 1871.

*To all whom it may concern:*

Be it known that I, EDWARD ALDOM, of New York city, in the county and State of New York, have invented a new Improved Spring-Perch for Bird-Cages, of which the following is a specification:

This invention relates to a new and useful improvement in the furniture of bird-cages; and consists in a spring-perch attached to the side of a cage and extending into the cage, as hereinafter more fully described.

Figure 1:
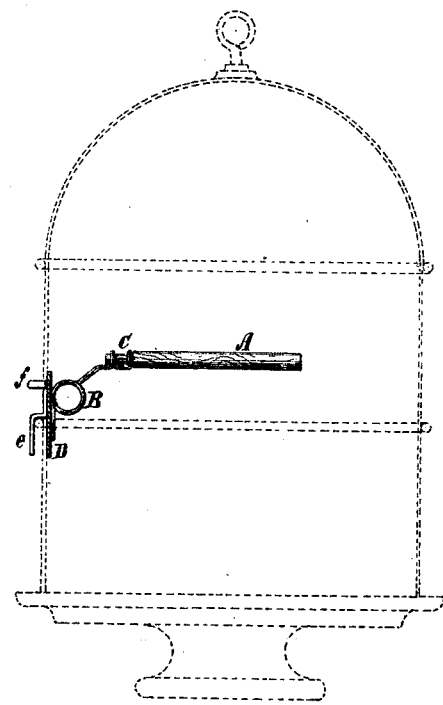
Figure 2:
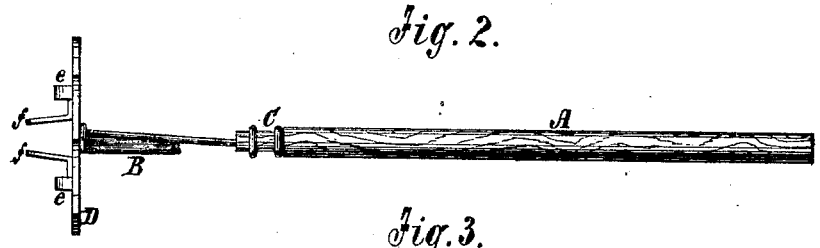
Figure 3:
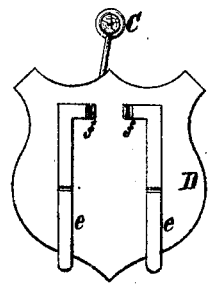

In the accompanying drawing, Figure 1 represents the spring-perch applied to the cage. Fig. 2 shows the spring-perch detached. Fig. 3 is a view of the plate by means of which the perch is attached to the cage.

Similar letters of reference indicate corresponding parts.

The cage is seen in Fig. 1 in dotted lines. A is the spring-perch. B is a wire-coil spring to which the perch is attached, as seen at C, the spring itself being soldered or otherwise fastened to a metallic plate, D. On the outer or opposite side of this plate are hooks $e\ e$ soldered or riveted thereto, and also fingers $f\ f$, which project outward, as seen in Fig. 2. The hooks $e\ e$ clasp the surrounding band-wire of the cage, as seen in Fig. 1, while between the fingers $f\ f$ one of the vertical wires of the cage is received. When the plate is thus attached the two fingers $f\ f$ may be bent together so that the vertical wire will be firmly clasped and the perch well supported in the position seen in Fig. 1. The perch A thus supported by the coil-spring resembles the bough or twig of a tree or bush in its elasticity, and gives the bird that graceful movement which is so much admired by the observers in birds of song when they are free to select their own perches in the open air.

Having thus described my invention, I claim as new and desire to secure by Letters Patent—

1. The perch A and spring B combined with a bird-cage, substantially as specified.

2. The plate D, provided with hooks $e\ e$ and fingers $f\ f$, in combination with the perch A and spring B, as and for the purpose specified.

EDWARD ALDOM.

Witnesses:
   GEO. W. MABEE,
   T. B. MOSHER. (170)